(12) United States Patent
Wu

(10) Patent No.: US 6,723,291 B1
(45) Date of Patent: Apr. 20, 2004

(54) FLUIDIZED BED POLYMERIZATION REACTOR

(75) Inventor: Wenqing Wu, Tianjin (CN)

(73) Assignees: China Petrochemical Corporation, Beijing; Tianjin United Chemical Corporation, Tianjin (CN)

( * ) Notice: Subject to any disclaimer, the term of this patent is extended or adjusted under 35 U.S.C. 154(b) by 591 days.

(21) Appl. No.: 09/643,494

(22) Filed: Aug. 22, 2000

(30) Foreign Application Priority Data

Aug. 30, 1999 (CN) ......................... 99118186 A

(51) Int. Cl.$^7$ .............. B05B 1/00; B05B 1/26; B01J 8/18
(52) U.S. Cl. ............... 422/143; 422/139; 239/504; 239/522; 34/582; 34/583; 34/588; 261/126
(58) Field of Search .................. 422/139, 140, 422/143; 239/504, 502, 518, 520–524; 34/576, 579, 582, 583, 585, 588; 261/108, 109, 113, 114.5, 126

(56) References Cited

U.S. PATENT DOCUMENTS

| 2,690,962 A | * 10/1954 | Clarke .................. 422/143 |
| 4,543,399 A | 9/1985 | Jenkins, III et al. ........ 526/70 |
| 4,588,790 A | 5/1986 | Jenkins, III et al. ........ 526/70 |
| 4,877,587 A | * 10/1989 | Rhee et al. ............... 422/135 |

* cited by examiner

*Primary Examiner*—Jerry D. Johnson
*Assistant Examiner*—Alexa Doroshenk
(74) *Attorney, Agent, or Firm*—Jenkens & Gilchrist, P.C.

(57) ABSTRACT

A novel flow deflector employed in a fluidized bed reactor for olefin polymerization is disclosed, which is installed on the entry conduit of the reactor, comprising an annular plate and a cone plate and providing at least three paths for the recycle stream to enter the mixing chamber, thereby permitting all the liquid and/or solid material to achieve a more complete and uniform mixing.

3 Claims, 3 Drawing Sheets

FLUIDIZED BED POLYMERIZATION REACTOR

FIELD OF THE INVENTION

The present invention relates to the improvement for a fluidized bed polymerization reactor. More particularly, it relates to the improvement for a flow deflector at the bottom of a fluidized bed polymerization reactor.

When an exothermic polymerization reaction is conducted in a fluidized bed reactor, the reaction rate is to be restricted so as to have time enough for removing the released heat from the fluidized bed. A method to raise the removal rate of the reaction heat is to compress and cool the gas in a monomer state that is needed to recycle back to the reactor so that it is partially condensed. The liquid generated is entrained by the recycle monomer gas stream and returns to the reactor together with the gas stream. This is referred to as the "condensing mode" operation of a polymerization reaction. U.S. Pat. Nos. 4,543,399 and 4,588,790 to Jenkins et al. disclose this operation method, which point out that this "condensing mode" operation allows a reduction in the temperature of the recycle gas stream and that the evaporation of the liquid requires absorption of heat. The combination of the two functions allows much higher space-time-yields in this mode than those in the"non-condensing mode".

The above operation modes both require the use of different inlet devices of the reactor, therefore the reactor has to be shut down for converting the inlet device when the interchange between the two operation modes is required. To solve this problem and further raise the productivity of the fluidized bed reactor, Chinese Patent Application No. 85106978 to UCC of U.S.A discloses a novel reactor inlet device-flow deflector. This flow deflector is installed under the distributor plate of the fluidized bed reactor and provides two fluid flow paths for the fluid to enter the mixing chamber, a first fluid flow path along the wall of the mixing chamber and a second upwardly fluid flow path. The preferred flow deflector is an annular flow deflector, having aperture for providing a central, upwardly oriented fluid flow path. Besides, it also provides a peripheral fluid flow path around the flow deflector and along the wall of the mixing chamber. It is claimed that during the operation of the flow deflector with such a structure, the build-up of the solid particles and the agglomeration of the liquid in the mixing chamber is prevented by sweeping the wall of the mixing chamber with the gas stream entering through the annular outer second fluid flow path peripherally around the annular flow deflector. As shown by the arrows in FIGS. 1 and 2 of this literature, the central upward gas stream is mixed with the peripheral gas flow and thereby a more uniform distribution of any liquid and/or solid in the gas flow is guaranteed.

However, according to our practice in many years' operation of this kind of annular flow deflector commonly adopted by the Unipol fluidized bed polymerization reactor imported from UCC, we found that this kind of flow deflectors have the following disadvantages when operated in the condensing mode:

1. Gas is non-uniformly distributed. The flow of the central gas flow is so great, and the velocity is so high that the recycle stream and the powders and liquid entrained by the stream lash directly at the lower surface of the distributor plate. If the recycle stream entrains polymer lumps, the polymer lumps smaller than $\phi 16$ mm would enter the holes of the distributor plate under the action of high speed stream and result in plugging. By contract, the velocity of the stream within the annular zone 500 mm from the periphery of the distributor plate along the radius direction would reduce, resulting in plugging in the distributor plate due to the frequent deposition of powders.

2. Deposited powders are likely to agglomerate into flakes. Because the area of the upper surface (i.e., the opposite of the flow direction of the recycle stream) of the flow deflector is relatively large and the stream flows through the central hole and the peripheral path of the annular flow deflector respectively, so the zone above this surface is a dead "zone" and powders often deposit. When the temperature of the inlet stream is high enough for the powders to soften and stick, flaky polymers with the same area as that of the upper surface of the annular flow deflector would form. When the reactor is operated in the condensing mode, these flakes fall off due to impact and soak by liquid and then lash at the distributor plate after being crushed by the impact of the stream, resulting in plugging.

3. The range of the amount of the condensing agent is narrow. For this kind of flow deflector, the amount of the condensing agent is restricted to a range of 3~10 wt %. This kind of flow deflector is not suitable to a greater amount of condensing agent.

Therefore, the present invention makes a bold improvement in the structure of the flow deflector. It is proved by the practical application that the flow deflector of the present invention has completely overcome the above disadvantages of the flow deflector in the prior art. Safe and stable operation is realized with a liquid content of the recycle stream in the range of 3~25 wt %. Because the amount of the condensed agent increases, the heat removal increases, so that the space-time-yield can further increase to 200% of the originally designed capacity.

For this reason, the present invention provides a novel fluidized bed reactor, which comprises:

d. a distributor plate under the fluidized section of the reactor;

e. a mixing chamber formed by confining the reactor space under the distributor plate with said distributor plate; and f. a flow deflector installed under the distributor plate and at the entry of the reactor bottom, characterized in that the flow deflector comprises an annular plate and a conic plate, the annular plate being positioned above the reactor bottom entry with a hole diameter of $D_1$ by spacers, the said annular plate having a central hole with a diameter of $D_2$; and the conic plate being located above the annular plate, concentric with the annular plate and supported on the annular plate by spacers, the conic plate being a reversed cone with a cone angle of a to the horizontal plane and having a central hole with a hole diameter of $D_3$;

the minimum section area between the annular plate and the reactor bottom being $S_1$, the minimum section area between the annular plate and the conic plate being $S_2$, and the circular area of the central hole of the conic plate being $S_3$;

the flow deflector being adapted to provide at least three paths for the gas stream to enter the mixing chamber, i.e., a first upwardly fluid flow path through the entry $D_1$ of the reactor bottom and section $S_1$ and along the wall of the mixing chamber, a second upwardly fluid flow path through the central hole $D_2$ of the annular plate and section $S_2$ below the conic plate and towards the side wall, and a third upwardly fluid flow path through the central hole $D_3$ of the conic plate.

The above characters of the present invention and the advantages of the invention over the prior art are described in detail referring to the following Figures:

BRIEF DESCRIPTION FOR DRAWINGS

DETAILED DESCRIPTION OF THE INVENTION

Figure 1:
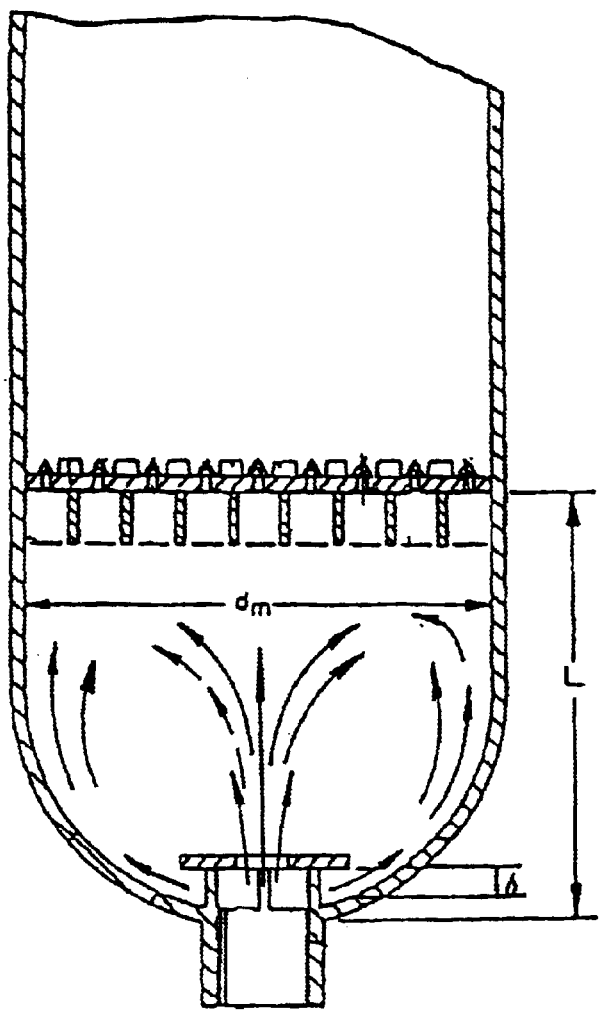
FIG. 1 is the elevational view in cross-section of the bottom of the fluidized bed reactor employed in the prior art, including: distributor plate, mixing chamber and flow deflector.
Figure 2:
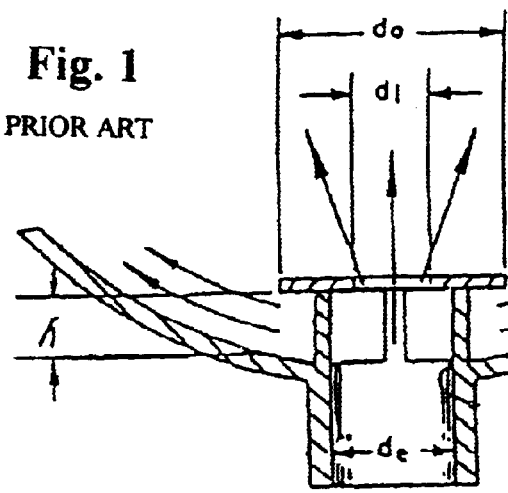
FIG. 2 is the enlarged view of the entry conduit and flow deflector in FIG. 1.
Figure 3:
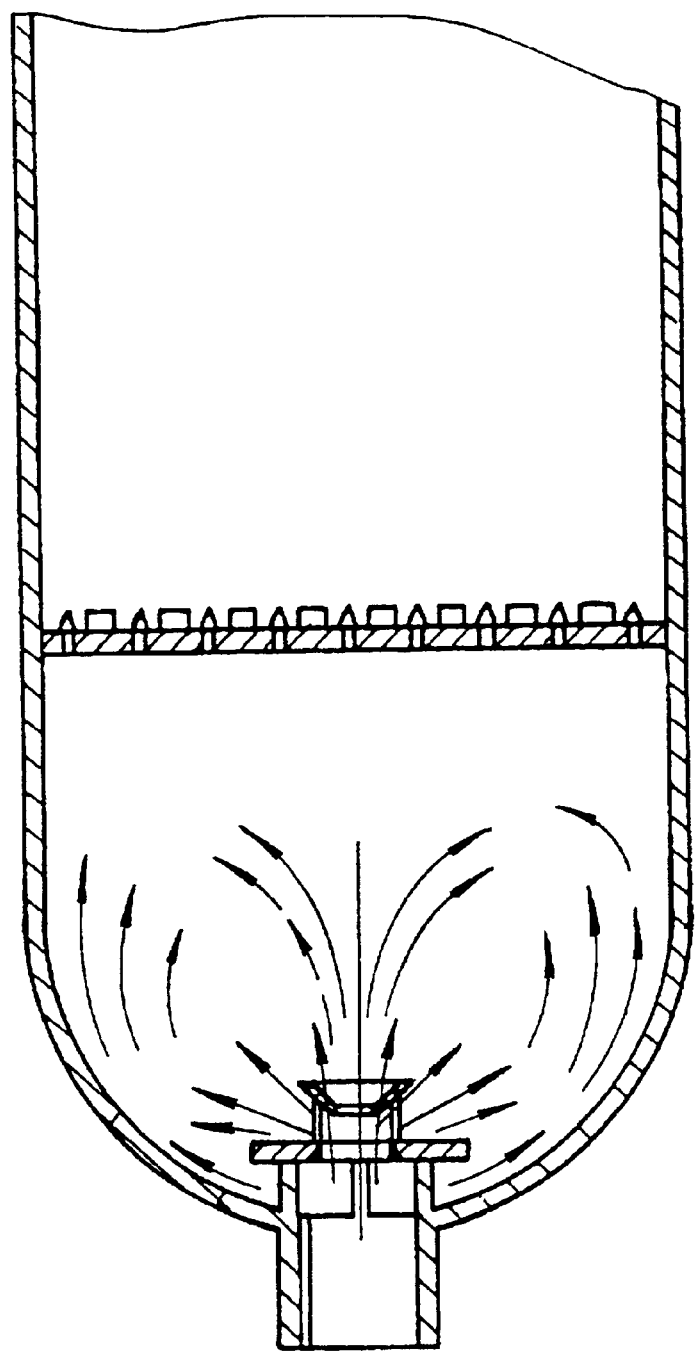
FIG. 3 is the elevational view in cross-section of the bottom of the fluidized bed reactor employed in the present invention, including: distributor plate, mixing chamber and flow deflector.
Figure 4:
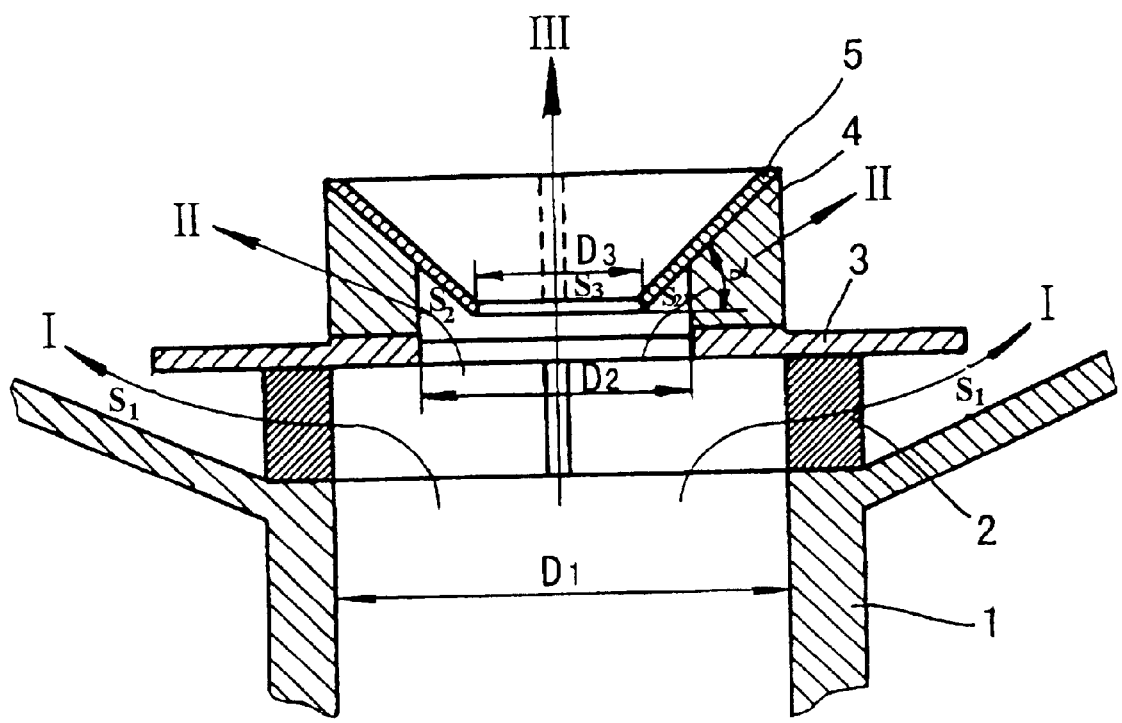
FIG. 4 is the enlarged view of the entry conduit and flow deflector in FIG. 3.

As shown in FIGS. 3 and 4, the annular plate 3 is positioned above the entry conduit 1 of the reactor bottom by spacers 2, and the conic plate 5 is positioned on the annular plate 3 by spacers 4. The recycle stream entering from the entry conduit 1 passes through the minimum section $S_1$ under the leading of the periphery of the annular plate 3 and forms the upward gas flow I along the wall of mixing chamber, which would impact the liquid falling back from the wall of the mixing chamber due to the actions of the gravity and the wall, thus, preventing the liquid from being accumulated at the reactor bottom and on the wall of the mixing chamber; another portion of the recycle stream passes through the central hole D2 of the annular plate and the minimum section $S_2$ and forms flow II flowing towards the side along the direction of cone angle α under the leading of the periphery of the conic plate 5, which would impact the upper surface of the annular plate and at the same time, form shear and impact with flow I and thereby re-entrains and re-atomizes the liquid departing from entraining and falling back to make it suspend in the gas stream; another portion of the stream passing through the central hole of the annular plate 3 continues flowing upwards and passes through the central hole D3 of the conic plate 5 to form flow III, which flows directly towards the distributor plate but the impact against the distributor plate is weakened due to the shunting action of stream II, and forms shear, impact, and mixing with streams I and II in the mixing chamber, thereby further re-atomizes and re-entrains the separated liquid, allowing any of the liquid and/or solid in the whole space under the distributor plate of the reactor to realize perfect mixing and leaving no dead corner as indicated by the arrows in the Figures, and thereby permitting thorough and uniform distribution of the gas flow when it passes through the distributor plate and enters the fluidized bed.

The structural sizes and parameters of each assembly of the flow deflector can be selected within the following ranges:

1. The ratio of the hole diameter of the conic plate, annular plate, and the entry conduit of the reactor bottom
   $D_1$—hole diameter of the entry conduit
   $D_2$—hole diameter of the central hole of the annular plate
   $D_3$—hole diameter of the central hole of the conic plate
   $D_1/D_2$=1.2–1.6, preferably $D_1/D_2$=1.44
   $D_2/D_3$=1.5–2.0, preferably $D_2/D_3$=1.77

2. The ratio of the path section area
   $S_1$—The minimum annular section area passed by gas flow I
   $S_2$—The minimum annular section area passed by gas flow II
   $S_3$—The minimum circular area passed by gas flow III
   $S_1/S_2$=3.8–4.4; preferably $S_1/S_2$=4.28
   $S_2/S_3$=2.0–3.5; preferably $S_2/S_3$=2.74

3. Resistance drop of the flow deflector
   The resistance drop of the flow deflector ΔP is calculated based on the total flow area of the flow deflector.
   ΔP=7.0–16 kPa, preferably 11 kPa 4. Cone angle of the conic plate α
   α=30–60°, preferably α=45°. Wherein the conic plate may adopt other shapes similar to a cone.

The flow deflector of the present invention has the following advantages over that of the prior art.

1. Allowing the liquid stream and powders to uniformly distribute in the gas phase after the recycle stream enters the mixing chamber, alleviating the impact force of the gas flow through the central hole against the distributor plate and making it difficult for the entrained polymer lumps to enter the distribution holes of φ16.

2. The atomization of the liquid is more uniform. The conic ring of 45 degrees strengthens the impact, friction and shear in the direction of titled side and the group of the liquid drops is re-atomized and suspended in the ascending stream, uniformly passing through the distributor plate and entering the reactor.

3. The deposition of the powders in the region within the annular zone 500 mm from the periphery of the distributor plate along the radius direction decreases because the flow in the side direction of 45 degree increases and thereby the plugging probability reduces.

4. The stream in the side direction of 45 degree no longer allows the powders to deposit on the upper surface of the flow deflector and therefore the flow deflector always maintains clean, having no "dead zone" and sticky flakes.

5. The throttling effect is better because the resistance drop increases by 11 kPa and the atomizing effect is improved.

6. Safe and stable operation is possible even when the liquid content is in the range of 3–25 wt %, and the space-time-yield of the reactor will further rise to 200% of the originally designed value. The period of continues operation for the reactor is increased to over twice of the original one.

The condensing agents employed in the present invention include volatile liquid saturated hydrocarbons, such as isopentane and n-hexane, but cyclopentane is preferred. This is the major inventive point of another application No. 99118185.9 (Docket No. FPCH99160015) jointly owned and copending with the present invention, the complete content of which is incorporated herein for reference.

The catalysts employed in the present invention include: coordinated anionic catalysts, cationic catalysts, free radical catalysts, and also include components of transition metals or metallocene and double peak product catalysts.

EXAMPLE

A Unipol fluidized bed reactor imported from UCC for olefin polymerization was employed, at the bottom of which a flow deflector of the present invention as shown in FIGS. 3 and 4 had been installed. It was operated in the condensing mode to produce low density polyethylene.

1. The run data of the DGM-1820 low density product
   Reaction feedstock: ethylene, butene-1, and hydrogen
   Flow of the recycle stream: 552000 kg/h
   Liquid content in the recycle stream: 10–22 wt %
   Space-time-yield: 180–230 kg/h·m³
   Product produced: low-density film product DGM-1820
   Catalyst: α type 2. Situations after 18 months of continuous operation The flow of the recycle stream was stable without fluctuation, proving that the atomization by the flow deflector was uniform.

There was no increase in the pressure drop of the distributor plate, which always maintained between 15–25 kPa, showing that there was no plugging in the distributor plate.

The temperatures at the four monitoring spots on the distributor plate were very uniform, temperature difference between any two spots being smaller than 0.05° C., showing that there was no plugging in the distributor plate and that the fluidizing state of the resin bed was good.

The total content of the liquid in the recycle stream reached 31 wt % temporarily and the operation of the reactor was still stable.

3. Situations inspected after 18 months of continuous operation

The part above the annular plate had not any powders and flakes and it was very clean and showed metal luster.

There were no depositing, hanging and adhesion of powders from the annular zone along the radius direction of 500 mm from the outer periphery of the lower surface of the distributor plate to the whole lower surface of the distributor plate. This part was very clean.

There was no plugging in 679 holes of φ16 of the distributor plate.

Sizes of the reactor and flow deflector:

Sizes of the reactor: diameter: 3.05 m; height of the cylindrical section 12 m.

Sizes of the flow deflector: $D_1$=467 mm; $D_2$=330 mm; $D_3$=186 mm.

The results show that no operation problem and unfavorable effect on the product are observed in the production run when the flow deflector of the present invention is used. Safe and stable operation is possible when the liquid content in the gas flow is in the range of 3–25 wt %. This shows that, with so high liquid contents, the liquid can still be entrained and atomized very well without accumulation at the bottom of the reactor and flooding. Inspection after shut down, has observed no plugging in the distributor plate due to the build-up of the resin and the wall of the mixing chamber and the surface of the flow deflector is clean.

I claim:

1. A fluidized bed reactor, which comprises:
   a. a distributor plate under the fluidized section of the reactor;
   b. a mixing chamber formed by confining the reactor space under the distributor plate with said distributor plate; and
   c. a flow deflector installed under the distributor plate and at the entry of the reactor bottom, characterized in that the flow deflector comprises an annular plate and a conic plate, the annular plate being positioned above the reactor bottom entry with a hole diameter of $D_1$ by spacers, the said annular plate having a central hole with a diameter of $D_2$; and the conic plate being located above the annular plate, concentric with the annular plate and supported on the annular plate by spacers, the conic plate being a reversed cone with a cone angle of α to the horizontal plane and having a central hole with a hole diameter of $D_3$;

the minimum section area between the annular plate and the reactor bottom being $S_1$, the minimum section area between the annular plate and the conic plate being $S_2$, and the circular area of the central hole of the conic plate being S3;

the flow deflector being adapted to provide at least three paths for the gas stream to enter the mixing chamber, a first upwardly fluid flow path through the entry $D_1$ of the reactor bottom and section $S_1$ and along the wall of the mixing chamber, a second upwardly fluid flow path through the central hole $D_2$ of the annular plate and section $S_2$ below the conic plate and towards the side wall, and a third upwardly fluid flow path through the central hole $D_3$ of the conic plate.

2. A reactor of claim 1, wherein the structural sizes and parameters of each assembly of the flow deflector are as follows:

α=30–60°;

$D_1/D_2$=1.2–1.6;

$D_2/D_3$=1.5–2.0;

$S_1/S_2$=3.8–4.8;

$S_2/S_3$=2.0–3.5; and the resistance drop of the flow deflector

ΔP=7.0–16 kPa.

3. A reactor of claim 2, wherein the structural sizes and parameters of each assembly of the flow deflector are as follows:

α=45°;

$D_1/D_2$=1.44; $D_2/D_3$=1.77;

$S_1/S_2$=4.28;

$S_2/S_3$=2.74; and

ΔP=11 kPa.

* * * * *